US012679770B2

(12) United States Patent
Hamamura

(10) Patent No.: US 12,679,770 B2
(45) Date of Patent: Jul. 14, 2026

(54) THERMAL INSULATION MATERIAL AND METHOD FOR PRODUCING THERMAL INSULATION MATERIAL

(71) Applicant: Each DreaM Co., Ltd., Ichinomiya (JP)

(72) Inventor: Hideo Hamamura, Ichinomiya (JP)

(73) Assignee: EACH DREAM CO., LTD., Ichinomiya (JP)

( * ) Notice: Subject to any disclaimer, the term of this patent is extended or adjusted under 35 U.S.C. 154(b) by 662 days.

(21) Appl. No.: 18/019,139

(22) PCT Filed: Sep. 18, 2020

(86) PCT No.: PCT/JP2020/035628
§ 371 (c)(1),
(2) Date: Mar. 30, 2023

(87) PCT Pub. No.: WO2022/030027
PCT Pub. Date: Feb. 10, 2022

(65) Prior Publication Data
US 2023/0278928 A1 Sep. 7, 2023

(30) Foreign Application Priority Data

Aug. 3, 2020 (JP) ................................. 2020-131657

(51) Int. Cl.
| | |
|---|---|
| *C04B 28/26* | (2006.01) |
| *C04B 14/02* | (2006.01) |
| *C04B 14/04* | (2006.01) |
| *C04B 14/08* | (2006.01) |
| *C04B 20/00* | (2006.01) |
| *C04B 40/00* | (2006.01) |
| *C04B 111/00* | (2006.01) |

(52) U.S. Cl.
CPC ............ *C04B 28/26* (2013.01); *C04B 14/022* (2013.01); *C04B 14/043* (2013.01); *C04B 14/08* (2013.01); *C04B 20/004* (2013.01); *C04B 40/0082* (2013.01); *C04B 2111/00612* (2013.01); *C04B 2201/30* (2013.01)

(58) Field of Classification Search
CPC ..... C04B 28/26; C04B 14/022; C04B 14/043; C04B 14/08; C04B 20/004; C04B 40/0082; C04B 7/32; C04B 28/06; C04B 18/10; C04B 2111/00612; C04B 2201/30; C04B 18/101; C04B 2111/28; Y02W 30/91
See application file for complete search history.

(56) References Cited

U.S. PATENT DOCUMENTS 4,171,985 A 10/1979 Motoki et al.

FOREIGN PATENT DOCUMENTS

| | | |
|---|---|---|
| CN | 106045546 A | 10/2016 |
| JP | S5426232 A | 2/1979 |
| JP | S61251554 A | 11/1986 |
| JP | S62246880 A | 10/1987 |
| JP | 6-99272 A * | 4/1994 |
| JP | H0699272 A | 4/1994 |
| JP | 2003146733 A | 5/2003 |
| JP | 2004169547 A | 6/2004 |
| JP | 2009256897 A | 11/2009 |
| JP | 2010121727 A | 6/2010 |
| KR | 20110082442 A | 7/2011 |

OTHER PUBLICATIONS

Machine Translation of China Patent Specification No. CN 106045546 A. (Year: 2016).*
Japanese office action issued on Aug. 20, 2024 in the corresponding Japanese patent application No. 2022-541103, with its English translation, 4 pages.
Extended European Search Report issued on Jul. 29, 2024, in the corresponding European patent application No. 20947876.7, 7 pages.
Chinese Second Office Action issued on Dec. 31, 2024 in the corresponding Chinese patent application No. 202080104139.4, with its English translation, 22 pages.
Korean First Office Action issued on Jan. 18, 2025 in corresponding Korean patent application No. 10-2013-7006751, with its English translation, 8 pages.
International Search Report received in PCT/JP2020/035628, date of mailing Nov. 17, 2020, 5 pages.
PCT International Preliminary Report on Patentability and Written Opinion, received in PCT/JP2020/035628, date of issuance Feb. 7, 2023, 7 pages.
Chinese Decision of Refusal dated Apr. 25, 2025, with its English translation, received in the corresponding Chinese patent application No. 202080104139.4, 20 pages.

(Continued)

*Primary Examiner* — Anthony J Green
(74) *Attorney, Agent, or Firm* — Hayes Soloway PC

(57) ABSTRACT

A thermal insulation material contains: a dehydration condensation reaction product of sodium silicate; alumina cement; and smoked charcoal. The thermal insulation material preferably further contains one or more selected from the group consisting of a silica-based hollow balloon, a silicate mineral, and diatomaceous earth. The thermal insulation material has, for example, a board-shaped form. In a method for producing a thermal insulation material, a raw material containing sodium silicate, alumina cement, and smoked charcoal is heated to cause a dehydration condensation reaction of the sodium silicate to occur.

4 Claims, 4 Drawing Sheets

(56)                 References Cited

OTHER PUBLICATIONS

Chinese office action issued on May 27, 2024 in the corresponding Chinese patent application No. 202080104139.4, with its English translation, 17 pages.
Taiwanese office action issued on Feb. 2, 2024 in the corresponding Taiwanese patent application No. 109132384, with its English translation, 10 pages.
European Office Action dated Oct. 6, 2025, received in the corresponding European patent application No. 20947876.7 2, 6 pages.
Indian Examination Report issued on Jan. 1, 2026 in the corresponding Indian Patent Application No. 202337013104, 6 pages.
Indian hearing notice issued on Apr. 16, 2026 in the corresponding Indian Patent Application No. 202337013104, 3 pages.

* cited by examiner

1

THERMAL INSULATION MATERIAL AND METHOD FOR PRODUCING THERMAL INSULATION MATERIAL

CROSS-REFERENCE TO RELATED APPLICATIONS

The present international application claims priority based on Japanese Patent Application No. 2020-131657 filed with the Japan Patent Office on Aug. 3, 2020, and the entire contents of Japanese Patent Application No. 2020-131657 are incorporated herein by reference.

TECHNICAL FIELD

The present disclosure relates to a thermal insulation material and a method for producing a thermal insulation material.

BACKGROUND ART

Conventionally, a thermal insulation material made of foamed plastic is known. A thermal insulation material made of foamed plastic is disclosed in Patent Literature 1. In addition, a thermal insulation material containing a rice hull is known. A thermal insulation material containing a rice hull is disclosed in Patent Literature 2.

CITATIONS LIST

Patent Literature

Patent Literature 1: JP 2010-121727 A
Patent Literature 2: JP 2004-169547 A

SUMMARY OF INVENTION

Technical Problems

Conventional thermal insulation materials have insufficient incombustibility. In one aspect of the present disclosure, it is preferable to provide a thermal insulation material having high incombustibility and a method for producing a thermal insulation material.

Solutions to Problems

One aspect of the present disclosure is a thermal insulation material containing: a dehydration condensation reaction product of sodium silicate; alumina cement; and smoked charcoal. The thermal insulation material according to one aspect of the present disclosure has high incombustibility.

Another aspect of the present disclosure is a method for producing a thermal insulation material, the method including: heating a raw material containing sodium silicate, alumina cement, and smoked charcoal to cause a dehydration condensation reaction of the sodium silicate to occur. According to the method for producing a thermal insulation material according to another aspect of the present disclosure, a thermal insulation material having high incombustibility can be produced.

2

Figure 2:
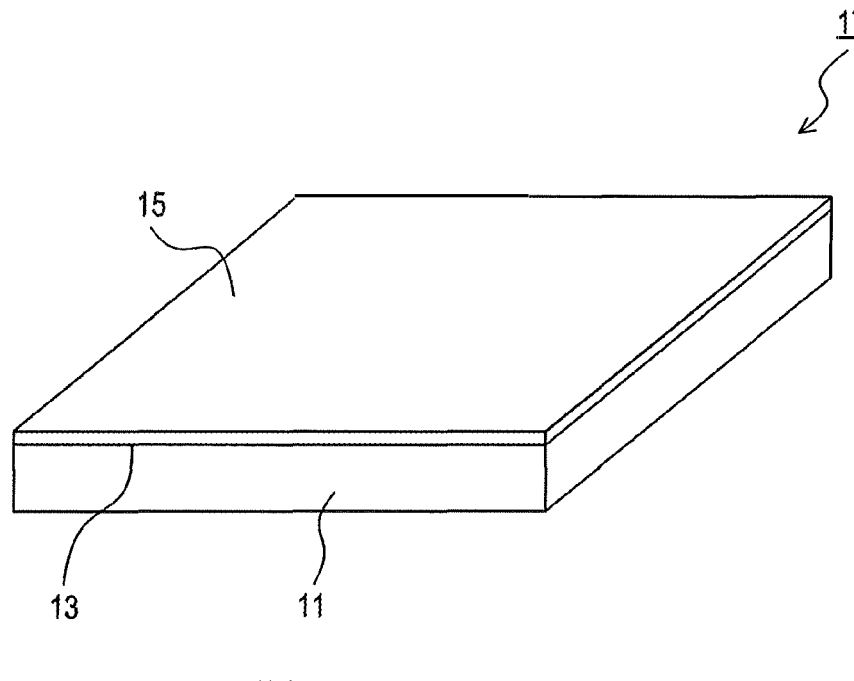
Figure 3:
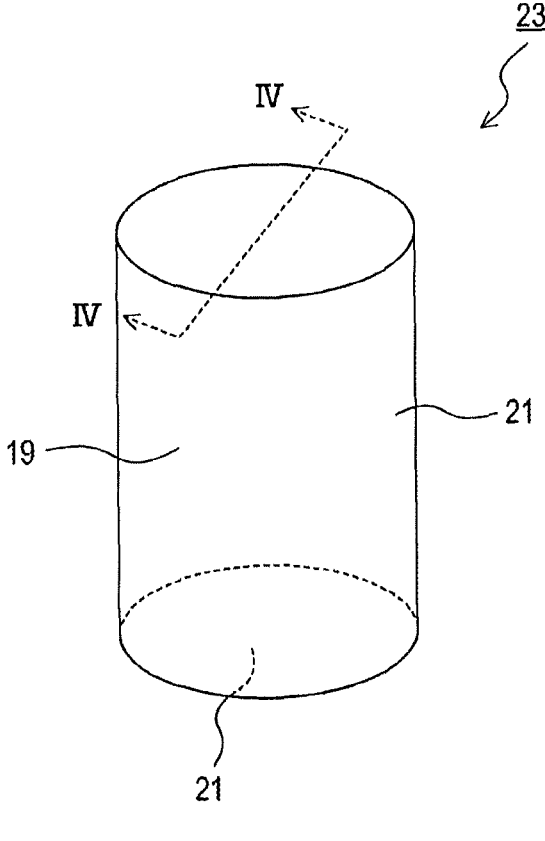
Figure 4:
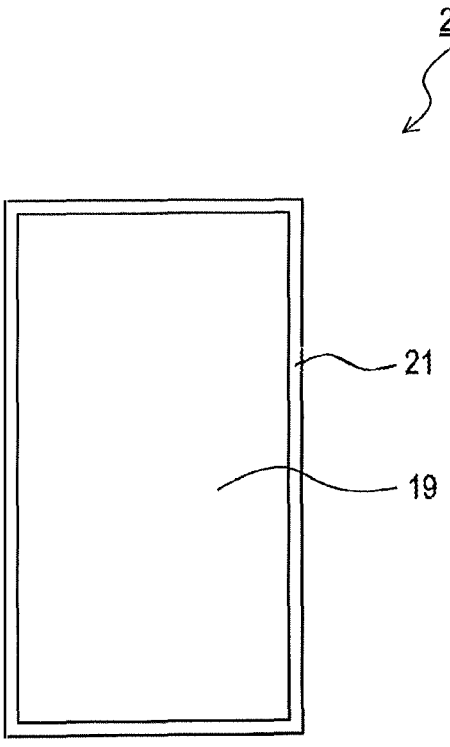

FIG. 2 is a perspective view illustrating a configuration of a first test piece.
FIG. 3 is a perspective view illustrating a configuration of a second test piece.
FIG. 4 is a cross-sectional view taken along a line IV-IV in FIG. 3.

REFERENCE SIGNS LIST

1 Specimen
3 Front surface
5 Back surface
6 Burner
7 Data logger
11 First thermal insulation material
13 One surface
15 Coating layer
17 First test piece
19 Second thermal insulation material
21 Coating layer
23 Second test piece

DESCRIPTION OF EMBODIMENTS

Exemplary embodiments of the present disclosure will be described with reference to the drawings.

1. Configuration of Thermal Insulation Material

The thermal insulation material contains (a) a dehydration condensation reaction product of sodium silicate, (b) alumina cement, and (c) smoked charcoal. The dehydration condensation reaction product of sodium silicate as the component (a) is a product produced through a dehydration condensation reaction of sodium silicate. The component (a) is, for example, a compound having a skeleton in which siloxane bonds are linked. The component (a) includes, for example, siloxane. The smoked charcoal as the component (c) is obtained by steaming and carbonizing rice hulls and wood chips.

The thermal insulation material preferably contains 40 parts by mass or more and 100 parts by mass or less of the component (b) with respect to 100 parts by mass of the component (a). When the amount of the component (b) blended in the thermal insulation material is within this range, heat resistance of the thermal insulation material is higher.

The thermal insulation material preferably contains 30 parts by mass or more and 80 parts by mass or less of the component (c) with respect to 100 parts by mass of the component (a). When the amount of the component (c) blended in the thermal insulation material is within this range, thermal insulation properties of the thermal insulation material are higher.

The thermal insulation material further contains, for example, one or more selected from the group consisting of a silica-based hollow balloon, a silicate mineral, and diatomaceous earth. When the thermal insulation material contains a silica-based hollow balloon, the incombustibility of the thermal insulation material is higher. When the thermal insulation material contains a silicate mineral, adhesive strength between the thermal insulation material and another member is higher. When the thermal insulation material contains diatomaceous earth, durability of the thermal insulation material is higher.

The thermal insulation material preferably contains 3 parts by mass or more and 15 parts by mass or less of the silica-based hollow balloon with respect to 100 parts by mass of the component (a). When the amount of the silica-based hollow balloon blended is within this range, the thermal insulation properties of the thermal insulation material are further higher.

The thermal insulation material preferably contains 1 part by mass or more and 10 parts by mass or less of the silicate mineral with respect to 100 parts by mass of the component (a). When the amount of the silicate mineral blended is within this range, the incombustibility of the thermal insulation material is further higher.

The thermal insulation material preferably contains 3 parts by mass or more and 20 parts by mass or less of the diatomaceous earth with respect to 100 parts by mass of the component (a). When the amount of the diatomaceous earth blended is within this range, the incombustibility of the thermal insulation material is further higher.

A form of the thermal insulation material is not particularly limited. The form of the thermal insulation material is, for example, a board-shaped form. The thermal insulation material can be used, for example, in buildings, heavy machines, vehicles, and the like. Examples of the building include a freezer warehouse. When the thermal insulation material is used in a heavy machine or a vehicle, for example, the thermal insulation material can be disposed around a member that generates heat. Examples of the member that generates heat include an internal combustion engine.

2. Method for Producing Thermal Insulation Material

In the method for producing a thermal insulation material according to the present disclosure, a raw material containing sodium silicate, alumina cement, and smoked charcoal is heated to cause a dehydration condensation reaction of the sodium silicate to occur. The produced thermal insulation material contains the component (a), the component (b), and the component (c). One hundred (100) parts by mass of sodium silicate becomes 60 parts by mass of the component (a) as a result of the dehydration condensation reaction.

The raw material preferably contains 40 parts by mass or more and 60 parts by mass or less of the alumina cement with respect to 100 parts by mass of the sodium silicate. When the amount of the alumina cement blended is within this range, the incombustibility of the thermal insulation material is further higher.

The raw material preferably contains 20 parts by mass or more and 50 parts by mass or less of the smoked charcoal with respect to 100 parts by mass of the sodium silicate. When the amount of the smoked charcoal blended is within this range, the thermal insulation properties of the thermal insulation material are further higher.

The raw material further contains, for example, one or more selected from the group consisting of a silica-based hollow balloon, a silicate mineral, and diatomaceous earth. When the raw material contains a silica-based hollow balloon, the incombustibility of the thermal insulation material is further higher. When the raw material contains a silicate mineral, the adhesive strength between the thermal insulation material and another member is further higher. When the raw material contains diatomaceous earth, the durability of the thermal insulation material is further higher.

The raw material preferably contains 1 part by mass or more and 10 parts by mass or less of the silica-based hollow balloon with respect to 100 parts by mass of the sodium silicate. When the amount of the silica-based hollow balloon blended is within this range, the thermal insulation properties of the thermal insulation material are further higher.

The raw material preferably contains 1 part by mass or more and 10 parts by mass or less of the silicate mineral with respect to 100 parts by mass of the sodium silicate. When the amount of the silicate mineral blended is within this range, the incombustibility of the thermal insulation material is further higher.

The raw material preferably contains 3 parts by mass or more and 20 parts by mass or less of the diatomaceous earth with respect to 100 parts by mass of the sodium silicate. When the amount of the diatomaceous earth blended is within this range, the durability of the thermal insulation material is further higher.

In the method for producing a thermal insulation material according to the present disclosure, for example, a thermal insulation material having a form corresponding to a mold can be produced by pouring a raw material having fluidity into the mold. The form of the thermal insulation material is, for example, a board-shaped form.

3. Effect Exerted by Thermal Insulation Material (3-1) The thermal insulation material of the present disclosure has high incombustibility.

(3-2) The rice hulls used in the conventional thermal insulation materials are natural products, and thus the conventional thermal insulation materials greatly vary in quality. Further, rice hulls are produced only in a specific season. In addition, it is difficult to store rice hulls for a long period. The smoked charcoal is less likely to cause the above problems as compared with rice hulls. Therefore, the thermal insulation material of the present disclosure can be stably produced.

4. Example 1

(4-1) Production of thermal insulation material

A liquid raw material was obtained by mixing the following components.

Sodium silicate JIS No. 3: 100 parts by mass

Silica-based hollow balloon: 10 parts by mass

Silicate mineral (wollastonite): 5 parts by mass

Diatomaceous earth: 10 parts by mass

Special cement: 70 parts by mass

Smoked charcoal: 50 parts by mass

Water: 30 parts by mass

The special cement corresponds to the alumina cement. Next, the liquid raw material was poured into a mold and heated at a temperature of 70° C. for 3 hours to yield a solid thermal insulation material. The thermal insulation material had a board-shaped form. When heated, the sodium silicate contained in the raw material became a dehydration condensation reaction product.

(4-2) Evaluation of thermal insulation material

A plate-shaped specimen 1 was prepared from the produced thermal insulation material. The size of the specimen 1 was 300 mm in length, 300 mm in width, and 16 mm in thickness.

Figure 1:
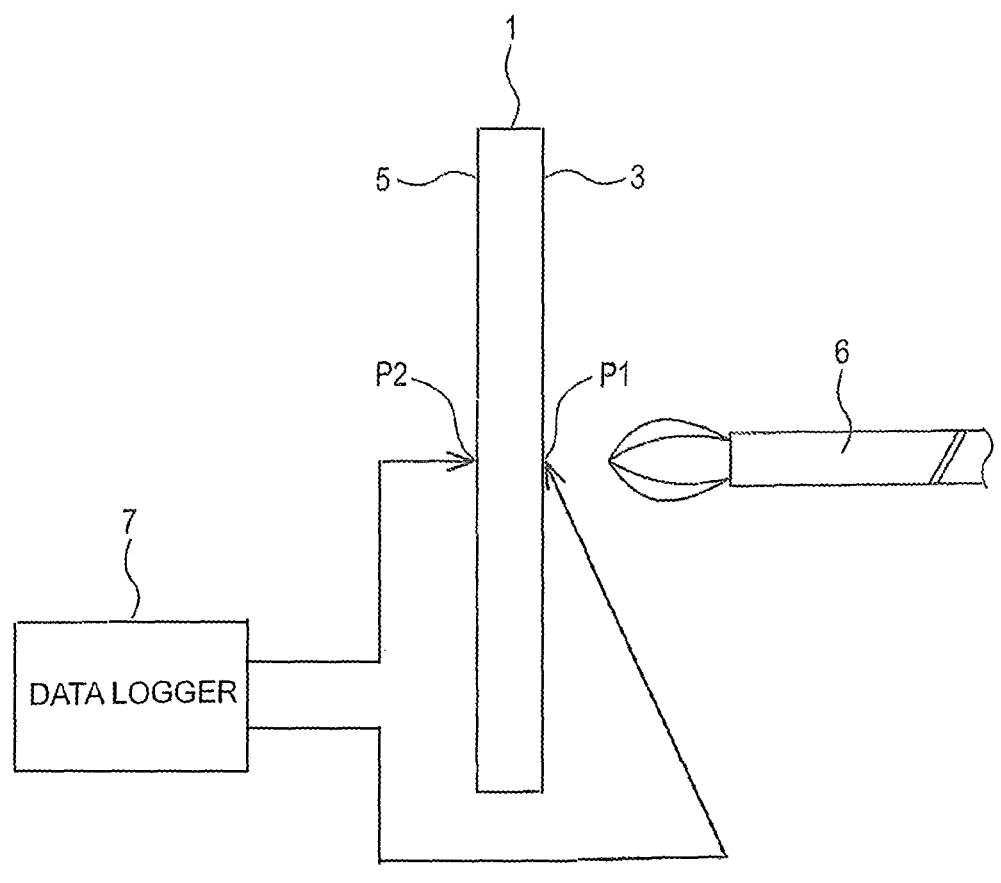
FIG. 1 is an explanatory view illustrating a method for evaluating a thermal insulation material.

As illustrated in FIG. 1, a point on a front surface 3 of the specimen 1 was defined as a first measurement point P1. A point on a back surface 5 of the specimen 1 was defined as a second measurement point P2. The back surface 5 is a surface opposite to the front surface 3. A straight line passing through the first measurement point P1 and the second measurement point P2 is parallel to the thickness direction of the specimen 1.

The first measurement point P1 was continuously heated using a burner 6. The burner 6 was Power Torch RZ-840 manufactured by Shinfuji Burner co., ltd. The room temperature was 23° C.

During a period when the first measurement point P1 was heated, the temperature at the first measurement point P1 and the temperature at the second measurement point P2 were each continuously measured using a thermocouple. The measured temperature was recorded by means of a data logger 7. The measurement results are shown in Table 1. The elapsed time in Table 1 is an elapsed time from the start of heating of the first measurement point P1.

TABLE 1

| Elapsed time | Temperature (° C.) | |
|---|---|---|
| (min) | P1 | P2 |
| 0 | 23.0 | 23.2 |
| 1 | 946.6 | 23.5 |
| 2 | 960.9 | 27.3 |
| 3 | 961.8 | 37.4 |
| 4 | 959.3 | 41.9 |
| 5 | 967.3 | 44.8 |
| 6 | 967.5 | 46.4 |
| 7 | 970.1 | 49.4 |
| 8 | 966.0 | 51.9 |
| 9 | 969.1 | 53.0 |
| 10 | 964.8 | 56.3 |

As shown in Table 1, even when the temperature at the first measurement point P1 rose, the temperature at the second measurement point P2 was difficult to rise. The specimen 1 did not ignite even at the time when 10 minutes elapsed. This evaluation result indicates that the thermal insulation material has high thermal insulation properties and incombustibility.

5. Example 2

(5-1) Production of Thermal Insulation Material

A liquid raw material was obtained by mixing the following components.

Sodium silicate JIS No. 3: 100 parts by mass
Silica-based hollow balloon: 4 parts by mass
Silicate mineral (wollastonite): 2 parts by mass
Diatomaceous earth: 8 parts by mass
Special cement: 60 parts by mass
Smoked charcoal: 40 parts by mass
Water: 40 parts by mass The special cement corresponds to the alumina cement. Next, the liquid raw material was poured into a first mold and heated at a temperature of 70° C. for 3 hours to yield a first thermal insulation material. The first thermal insulation material had a solid board-shaped form. The size of the first thermal insulation material was 99 mm in length, 99 mm in width, and 15 mm in thickness. When heated, the sodium silicate contained in the raw material became a dehydration condensation reaction product. The first thermal insulation material was then removed from the first mold.

Also, the liquid raw material was poured into a second mold and heated at a temperature of 70° C. for 3 hours to yield a second thermal insulation material. The second thermal insulation material had a solid columnar form. The second thermal insulation material had a diameter of 44 mm. The second thermal insulation material had a height of 50 mm. When heated, the sodium silicate contained in the raw material became a dehydration condensation reaction product. The second thermal insulation material was then removed from the second mold.

(5-2) Preparation of test piece

A liquid coating agent was obtained by mixing the following components.

Sodium silicate JIS No. 3: 74.0 parts by mass
Shirasu balloon: 7.4 parts by mass
Silicate mineral (wollastonite): 7.4 parts by mass
Alumina cement: 11.2 parts by mass As illustrated in FIG. 2, a coating layer 15 was formed on one surface 13 of a first thermal insulation material 11. The method for forming the coating layer 15 was a method in which a coating agent was applied to the one surface 13 and heated at 100° C. for 3 hours. The coating layer 15 had a thickness of 0.5 mm. The first thermal insulation material 11 including the coating layer 15 was used as a first test piece 17.

As illustrated in FIGS. 3 and 4, a coating layer 21 was formed on the entire front surface of a second thermal insulation material 19. The method for forming the coating layer 21 was a method in which a coating agent was applied to the entire front surface of the second thermal insulation material 19 and heated at 100° C. for 3 hours. The coating layer 21 had a thickness of 0.5 mm. The second thermal insulation material 19 including the coating layer 21 was used as a second test piece 23.

(5-3) Evaluation of pyrogenicity

The first test piece 17 was subjected to a pyrogenicity test in accordance with ISO-5660. In the pyrogenicity test, the first test piece 17 was heated for 20 minutes. Radiant intensity was 50 kW/m². The surface to which radiant heating was applied was the one surface 13.

A total amount of heat generated was 0.2 MJ/m², which was very small. A maximum heat generation rate was 1.88 kW/m², which was very low. After the pyrogenicity test, the first test piece 17 was not deformed. The first test piece 17 did not ignite. The results of the pyrogenicity test indicate that the first test piece 17 has high incombustibility.

(5-4) Evaluation of incombustibility

The second test piece 23 was subjected to an incombustibility test in accordance with ISO-1182. The test method was as follows. A cylindrical electric furnace was prepared. The number of the second test pieces 23 used in the test was 3. The masses of the second test pieces 23 before the test were 63.9 g, 64.5 g, and 73.6 g, respectively.

An internal temperature of the electric furnace was adjusted to 750±5° C. After the adjustment of the internal temperature of the furnace, the power consumption of the electric furnace was made constant. After the adjustment of the internal temperature of the furnace, each of the second test pieces 23 was inserted into the furnace. After the insertion of the second test piece 23, the internal temperature of the furnace and a front surface temperature of the second test piece 23 were continuously measured. In addition, the mass of the second test piece 23 was measured before and after the test. In addition, the shape of the second test piece 23 was measured before and after the test. The test was continued until the internal temperature of the furnace reached a final equilibrium temperature The final equilibrium temperature is an internal temperature of the furnace when the internal temperature of the furnace is in a stable state within a range of ±2° C. for 10 minutes.

Raised internal temperatures of the furnace on the front surfaces of the second test pieces 23 were 5.0° C., 1.3° C., and –0.5° C. The raised internal temperature of the furnace is a value obtained by subtracting the final equilibrium temperature from a maximum internal temperature of the furnace. The maximum internal temperature of the furnace is the maximum value of the internal temperature of the furnace in a period from the insertion of the second test piece 23 to the end of the test. Mass reduction rates WR of the second test pieces 23 were 13.1%, 14.2%, and 13.0%. The mass reduction rate WR is a value represented by the following Equation (1).

$$WR = ((W1 - W2)/W1) \times 100 \qquad \text{Equation (1)}$$

In Equation (1), W1 is the mass of the second test piece 23 before the test. W2 is the mass of the second test piece 23 after the test.

The raised internal temperature of the furnace on the front surface of the second test piece 23 was lower than 20° C., which is the standard in ISO-1182. The mass reduction rate WR was smaller than 30%, which is the standard in ISO-1182. In addition, the shape of the second test piece 23 after the test was not greatly changed as compared with the shape of the second test piece 23 before the test. The results of the incombustibility test indicate that the second test piece 23 has high incombustibility.

6. Other Embodiments

Although the embodiments of the present disclosure have been described above, the present disclosure is not limited to the above-described embodiments, and can be implemented with various modifications.

(6-1) A plurality of functions of one component in the above embodiments may be realized by a plurality of components, or one function of one component may be realized by a plurality of components. In addition, a plurality of functions of a plurality of components may be realized by one component, or one function realized by a plurality of components may be realized by one component. A part of the configuration of the above embodiment may be omitted. At least a part of the configuration of the above embodiment may be added to or replaced with the configuration of another embodiment described above.

(6-2) In addition to the thermal insulation material described above, the present disclosure can also be realized in various forms such as a system including the thermal insulation material as a component.

The invention claimed is:

1. A thermal insulation material comprising:
   a dehydration condensation reaction product of sodium silicate as a component (a);

40 parts by mass or more and 100 parts by mass or less of alumina cement with respect to 100 parts by mass of the component (a);
   30 parts by mass or more and 80 parts by mass or less of smoked charcoal with respect to 100 parts by mass of the component (a); and
   one or more selected from the group consisting of:
      3 parts by mass or more and 15 parts by mass or less of a silica-based hollow balloon with respect to 100 parts by mass of the component (a);
      1 part by mass or more and 10 parts by mass or less of a silicate mineral with respect to 100 parts by mass of the component (a); and
      3 parts by mass or more and 20 parts by mass or less of a diatomaceous earth with respect to 100 parts by mass of the component (a).

2. The thermal insulation material according to claim 1, having a board-shaped form.

3. A method for producing a thermal insulation material, the method comprising:
   heating a raw material comprising sodium silicate, alumina cement, and smoked charcoal to cause a dehydration condensation reaction of the sodium silicate to occur;
   the raw material containing:
   sodium silicate as a component (a);
   40 parts by mass or more and 60 parts by mass or less of alumina cement with respect to 100 parts by mass of the component (a);
   20 parts by mass or more and 50 parts by mass or less of smoked charcoal with respect to 100 parts by mass of the component (a); and
   one or more selected from the group consisting of:
      1 part by mass or more and 10 parts by mass or less of a silica-based hollow balloon with respect to 100 parts by mass of the component (a);
      1 part by mass or more and 10 parts by mass or less of a silicate mineral with respect to 100 parts by mass of the component (a); and
      3 parts by mass or more and 20 parts by mass or less of a diatomaceous earth with respect to 100 parts by as of the component (a).

4. The method for producing a thermal insulation material according to claim 3, further comprising the step of pouring the raw material into a mold to produce the thermal insulation material having a board-shaped form.

* * * * *